(12) United States Patent
Fuchikami et al.

(10) Patent No.: US 8,780,990 B2
(45) Date of Patent: Jul. 15, 2014

(54) IMAGING DEVICE FOR MOTION VECTOR ESTIMATION USING IMAGES CAPTURED AT A HIGH FRAME RATE WITH BLUR DETECTION AND METHOD AND INTEGRATED CIRCUIT PERFORMING THE SAME

(75) Inventors: Ryuji Fuchikami, Hiroshima (JP); Kenji Shimizu, Fukuoka (JP); Tomoo Kimura, Fukuoka (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 637 days.

(21) Appl. No.: 13/140,069

(22) PCT Filed: Nov. 12, 2009

(86) PCT No.: PCT/JP2009/006041
§ 371 (c)(1),
(2), (4) Date: Jun. 16, 2011

(87) PCT Pub. No.: WO2010/070809
PCT Pub. Date: Jun. 24, 2010

(65) Prior Publication Data
US 2011/0249750 A1  Oct. 13, 2011

(30) Foreign Application Priority Data
Dec. 16, 2008  (JP) ................ 2008-319230

(51) Int. Cl.
*H04N 7/12*  (2006.01)
*H04N 5/272*  (2006.01)
*H04N 7/18*  (2006.01)

(52) U.S. Cl.
CPC ............ *H04N 7/12* (2013.01); *H04N 5/272* (2013.01); *H04N 7/188* (2013.01)
USPC ............ 375/240.16; 348/154; 348/239

(58) Field of Classification Search
CPC .......... H04N 7/12; H04N 5/272; H04N 7/188
USPC ............................................. 375/240.16
See application file for complete search history.

(56) References Cited

U.S. PATENT DOCUMENTS 5,751,364 A * 5/1998 Yasuda et al. ............ 375/240.16
7,177,659 B2  2/2007 Cho (Continued)

FOREIGN PATENT DOCUMENTS

| JP | 07-177425 | 7/1995 |
|---|---|---|
| JP | 08-251473 | 9/1996 |
| JP | 08-251474 | 9/1996 |
| JP | 2004-364265 | 12/2004 |

(Continued)

OTHER PUBLICATIONS

International Search Report issued Feb. 16, 2010 in PCT/JP2009/006041.

(Continued)

*Primary Examiner* — Jessica Prince
(74) *Attorney, Agent, or Firm* — Wenderoth, Lind & Ponack, L.L.P.

(57) ABSTRACT

An imaging device includes a frame rate conversion unit synthesizing images captured at a second frame rate higher than a first frame rate to convert the images into a synthesized image having the first frame and a motion estimation unit performing motion estimation between consecutive frames of the images captured at the second frame. The imaging device also includes a motion vector synthesis unit synthesizing motion vectors having the second frame rate, to generate a synthesized motion vector of a target macroblock in the synthesized image, a motion blur amount determination unit counting, in an area surrounding the target macroblock, the number of macroblocks having the same synthesized motion vector as the target macroblock and comparing a value derived from the number of counted macroblocks with a threshold value, and a motion vector selection unit selecting the synthesized motion vector when the derived value determined to exceed the threshold value.

9 Claims, 9 Drawing Sheets

(56) References Cited

U.S. PATENT DOCUMENTS

| | | |
|---|---|---|
| 7,463,686 B2 | 12/2008 | Seo |
| 2004/0077369 A1 | 4/2004 | Cho |
| 2004/0156436 A1 | 8/2004 | Seo |
| 2007/0092145 A1* | 4/2007 | Shimizu ......................... 382/233 |
| 2008/0278631 A1* | 11/2008 | Fukuda ......................... 348/607 |
| 2008/0298695 A1* | 12/2008 | Yoshimura ................... 382/236 |
| 2009/0167909 A1* | 7/2009 | Imagawa et al. ............. 348/262 |
| 2010/0214422 A1 | 8/2010 | Iwamura et al. |

FOREIGN PATENT DOCUMENTS

| | | |
|---|---|---|
| JP | 2006-129326 | 5/2006 |
| JP | 2007-281961 | 10/2007 |
| WO | 2007/063819 | 6/2007 |

OTHER PUBLICATIONS

International Search Report issued Feb. 5, 2010 in PCT/JP2009/006041.

* cited by examiner

IMAGING DEVICE FOR MOTION VECTOR ESTIMATION USING IMAGES CAPTURED AT A HIGH FRAME RATE WITH BLUR DETECTION AND METHOD AND INTEGRATED CIRCUIT PERFORMING THE SAME

TECHNICAL FIELD

The present invention relates to an imaging device which captures moving images while encoding the moving images.

BACKGROUND ART

Some of conventional imaging devices which capture moving images while encoding the moving images employ, for example, the MPEG encoding. In the MPEG encoding, a motion vector between an encoding-target frame and a previous frame is obtained by a motion vector estimation executed for each sub-block called a macroblock. Using the obtained motion vector, a difference between blocks is calculated. Then, the conventional imaging device encodes the resultant motion-compensated image difference.

Examples of such a conventional imaging device include an imaging device which captures images at a frame rate higher than a target encoding frame rate and uses the high-frame-rate images for a motion vector estimation to enable the estimation in a larger area with a less amount of calculation (see Page 24 and FIG. 1 of Patent Reference 1, for example). FIG. 1 is a diagram showing an example of a configuration of a conventional imaging device having a high-speed image capturing capability.

In FIG. 1, the imaging device includes an imaging unit 101, an image receiving unit 102, a motion estimation unit 103, a motion vector synthesis unit 104, an encoding unit 105, an internal bus 106, a Dynamic Random Access Memory (DRAM) control unit 107, a memory card control unit 108, a DRAM 109, a memory card 110, and a frame rate conversion unit 111. It should be noted that the components enclosed by a dotted line are implemented by an integrated circuit. The imaging unit 101 captures moving images at a high frame rate which is n-times higher than a target encoding frame rate ("n" is a real number larger than 1). The images captured at the high frame rate are written into the DRAM 109 by the image receiving unit 102 via the internal bus 106 and the DRAM control unit 107.

The frame rate conversion unit 111 converts the high-frame-rate images stored in the DRAM control unit 107 into images having the target encoding frame rate. It should be noted that although "n" is a real number, the following describes a case, as an example, where "n" is an integer for ease of explanation. For example, the frame rate conversion unit 111 synthesizes an n number of images captured at the nX-speed high frame rate into a single image so as to convert the images into an image having the target encoding frame rate.

The motion estimation unit 103 sequentially performs a motion vector estimation between adjacent frames of the images captured at the high frame rate. Vectors obtained as a result of the estimations performed by the motion estimation unit 103 are synthesized by the motion vector synthesis unit 104. Accordingly, a synthesized motion vector corresponding to the target encoding frame rate is generated. The images captured at the high frame rate are accumulated in the DRAM 109 as many as needed to obtain at least the synthesized motion vector. To be more specific, the DRAM 109 stores at least an "n+1" number of previous frames of the images captured at the nX-speed high frame rate.

The encoding unit 105 performs motion compensation on the synthesized frame image generated by the frame rate conversion unit 111 using the synthesized motion vector generated by the motion vector synthesis unit 104, and then encodes the resultant difference. Moreover, the encoding unit 105 records the encoded image into the memory card 110 via the memory card control unit 108.

With the configuration described thus far, the motion estimation using the images at the high frame rate can improve processing efficiency in the motion estimation. When an estimation distance per motion vector estimation is m pixels, a target estimation area is $m^2$. Here, since the synthesis is performed an n number of times, a motion vector corresponding to an n*m pixel distance can be estimated by calculation performed only on an $n*m^2$ area as a target estimation area.

When it is desired that images are captured at the same rate as the target encoding frame rate and that a motion vector corresponding to the same n*m pixel distance as above is estimated, the motion vector estimation needs to be performed on an $(n*m)^2$ area.

More specifically, $(n*m)^2 \div n*m^2 = n$. The image capturing at the nX-speed high frame rate can improve the efficiency in nX-speed motion estimation processing.

This means that when the same calculation amount is assigned to the motion estimation processing, a larger estimation area can be allocated. In other words, when an object moving more actively is captured, more improvement can be expected in the encoding efficiency.

CITATION LIST

Patent Literature

[PTL 1]
Japanese Unexamined Patent Application Publication No. 2007-281961
[PTL 2]
Japanese Unexamined Patent Application Publication No. 2006-129326

SUMMARY OF INVENTION

Technical Problem

However, the conventional configuration may end up estimating a motion vector which is inappropriate in terms of the encoding efficiency.

The following explains a problem of the cases where: image capturing is performed when a small object is moving in front of a background; and image capturing is performed when a large object is moving in front of the background. In these cases, the size of a macroblock is, as an example, 16×16 pixels, which is a typical size in the MPEG encoding.

FIG. 2 is a diagram showing captured object images, a captured background image, and a synthesized image, and also showing relative coordinates of each macroblock included in the images. A small object image captured in the size of 1×1 macroblock is shown as "A" in (A) of FIG. 2. A large object image captured in the size of 3×3 macroblocks is shown as "B" in (B) of FIG. 2. A background image captured in the size of 14×5 macroblocks is shown as "C" in (C) of FIG. 2.

Note that a macroblock in a y-th row and an x-th column is represented as "$A_{y,x}$", "$B_{y,x}$", or "$C_{y,x}$".

FIG. 3 shows images obtained by shooting a scene where an object A, captured as the image A, is moving toward the right by 16 pixels per 1/300 seconds in front of the background image C. In the present example, 10 frames are captured at 300 frames per second (fps) which is five times higher than the target encoding frame rate of 60 fps.

A macroblock $A_{0,0}$ serving as the center and sole macroblock of the object image A overlays a macroblock $C_{1,1}$ of the background image C in Frame 0, and then moves to a position to overlay a macroblock $C_{1,10}$ of the background image C in Frame 9.

From the images captured at the nX-speed high frame rate, encoding-target images at a 1× frame rate can be obtained by frame rate conversion. The following describes a synthesis method, as the most common example, whereby the frame rate conversion unit 111 obtains an image with a 1/60-second exposure by adding five frames captured at a 1/300 exposure. For example, as shown in FIG. 3, from 10 frame images at the high frame rate, a synthesized frame image D and a synthesized frame image E are obtained as two synthesized images at the target frame rate. The synthesized frame image D is shown at the lower left of FIG. 3 whereas the synthesized frame image E is shown at the lower right of FIG. 3. As shown in FIG. 3, each of the synthesized frame images D and E includes a synthesized motion blur formed by the object A moving in front of the background image C. A macroblock in the synthesized frame images D and E is also defined by relative coordinates such as "$D_{y,x}$" or "$E_{y,x}$" as shown in (D) and (E) of FIG. 2.

Here, an encoding process performed on a macroblock $E_{1,8}$ in the synthesized frame image E is examined, with reference to FIG. 3.

A motion vector of the macroblock $E_{1,8}$ is obtained from the images captured at the high frame rate. Since the image of the object A moving in front of the background image C is synthesized in the macroblock $E_{1,8}$, a motion vector of the image of the object $A_{0,0}$ located on the same position as the macroblock $E_{1,8}$ in the high-frame-rate image is obtained. To be more specific, based on the corresponding pixel coordinates (23, 135) in Frame 7 as the center pixel, an estimation is performed on Frame 6. As a result, a vector (0, −16) is first obtained. Then, based on coordinates (23, 119) corresponding to the position (0, −16) in Frame 6, an estimation is performed on Frame 5. As a result, a vector (0, −16) is obtained. After such an estimation between adjacent Frames is repeated up to Frame 2, five vectors each represented by (0, −16) are obtained. In the end, these obtained five motion vectors among 5×-speed frames are synthesized to obtain a synthesized motion vector (0, −80).

Here, an image in the synthesized frame image D based on the synthesized motion vector (0, −80) of the macroblock $E_{1,8}$ corresponds to a macroblock $D_{1,3}$ in the size of 16×16 pixels having the center pixel (23, 55).

The images of the macroblocks $E_{1,8}$ and $D_{1,3}$ are examined. The image of the macroblock $D_{1,3}$ is generated by synthesizing the images of Frames 0 to 4. More specifically, the macroblock $A_{0,0}$ in the image of the moving object A and the macroblock $C_{1,3}$ in the background image C are synthesized in such a manner to calculate $(1*A_{0,0}+4*C_{1,3})$. Similarly, the image of the macroblock $E_{1,8}$ is generated by synthesizing the images of Frames 5 to 9. More specifically, the macroblock $A_{0,0}$ in the image of the moving object A and the macroblock $C_{1,8}$ in the background image C are synthesized in such a manner to calculate $(1*A_{0,0}+4*C_{1,8})$. Meanwhile, the image of the macroblock $D_{1,8}$, for example, is generated by synthesizing the images of Frames 0 to 4 only based on the macroblock $C_{1,8}$ in the background image C, in such a manner to calculate $(5*C_{1,8})$.

Here, it should be noted that, in the synthesized frame images D and E, an image component of the object A tracked by the motion vector makes up only a 1/5 proportion in each of the corresponding macroblocks. The image of the small object which is moving fast is added to the background image by the frame rate conversion and thus changes to a faint motion blur to blend into the background image C. On account of this, in terms of the encoding efficiency, the tracking processing needs to be performed on the background image C whose image component makes up a 4/5 proportion in the macroblock. To be more specific, based on a motion vector (0, 0), the synthesized image $(5*C_{1,8})$ of the macroblock $D_{1,8}$ located in the synthesized frame image D at the position corresponding to the macroblock $E_{1,8}$ may be used in motion compensation. This improves a degree of image matching accuracy, thereby enhancing the encoding efficiency.

This case shows a problem of the conventional technology, that is, the accuracy of image matching between the macroblocks may be increased more when motion compensation is performed using the motion vector of the background image instead of using the synthesized motion vector tracking the moving object.

The following describes a case where the conventional technology turns out successfully.

FIG. 4 shows images obtained by shooting a scene where an object B, captured as the image B, is moving toward the right by 16 pixels per 1/300 seconds in front of the background image C. In the present example, 10 frames are captured at 300 fps which is five times higher than the target encoding frame rate of 60 fps.

A macroblock $B_{1,1}$ serving as the center macroblock of the object image B overlays a macroblock $C_{2,2}$ of the background image in Frame 0, and then moves to a position to overlay a macroblock $C_{2,11}$ of the background image in Frame 9.

The encoding-target image can be obtained by the frame rate conversion performed by the frame rate conversion unit 111. The following describes a synthesis method, as the most common example, whereby an image with a 1/60-second exposure is obtained by adding five frames captured at the 1/300 second-rate. From 10 frame images, a synthesized frame image F and a synthesized frame image G are obtained as two synthesized frame images at a target frame rate. The image F is shown at the lower left of FIG. 4 whereas the image G is shown at the lower right of FIG. 4. Each position of the macroblocks in the synthesized frame images F and G is also defined by relative coordinates such as "$F_{y,x}$" or "$G_{y,x}$" as shown in (F) and (G) of FIG. 2.

Here, the encoding process performed on a macroblock $G_{2,9}$ in the synthesized frame image G is examined.

A motion vector of the macroblock $G_{2,9}$ is obtained from the images captured at the high frame rate. To be more specific, based on the corresponding pixel coordinates (39, 151) in Frame 7 as the center pixel, an estimation is performed on Frame 6. As a result, a vector (0, −16) is first obtained. Then, based on coordinates (39, 135) corresponding to the position (0, −16) in Frame 6, an estimation is performed on Frame 5. As a result, a vector (0, −16) is obtained. After such an estimation between adjacent Frames is repeated up to Frame 2, five vectors each represented by (0, −16) are obtained. In the end, these obtained five motion vectors among 5×-speed frames are synthesized to obtain a synthesized motion vector (0, −80).

Here, an image in the macroblock in the synthesized frame image D based on the synthesized motion vector (0, −80) of the macroblock $G_{2,9}$ corresponds to a macroblock $F_{2,4}$ in the size of 16×16 pixels having the center pixel (39, 71).

The images of the macroblocks $G_{2,9}$ and $F_{2,4}$ are examined. The image of the macroblock $F_{2,4}$ is generated by synthesizing the images of Frames 0 to 4. More specifically, the macroblocks $B_{1,0}$, $B_{1,1}$, and $B_{1,2}$ in the image of the moving object B and the macroblock $C_{2,4}$ in the background image C are synthesized in such a manner to calculate $((B_{1,0}+B_{1,1}+B_{1,2})+2*C_{2,4})$. Similarly, the image of the macroblock $G_{2,9}$ is generated by synthesizing the images of Frames 5 to 9. More specifically, the macroblocks $B_{1,0}$, $B_{1,1}$, and $B_{1,2}$ and the macroblock $C_{2,9}$ in the background image C are synthesized in such a manner to calculate $((B_{1,0}+B_{1,1}+B_{1,2})+2*C_{2,9})$.

In the present example, the synthesized motion vector of the macroblocks $G_{2,9}$ and $F_{2,4}$ in the synthesized frame images F and G is (0, −80) as in the example shown in FIG. 3. However, an image component of the object B makes up a ⅗ proportion in each of the macroblocks $G_{2,9}$ and $F_{2,4}$ in the synthesized frame image D and E. On account of this, the encoding efficiency is increased when the tracking processing is performed based on the motion of the object B instead of the motion of the background whose image component makes up only a ⅖ proportion in the macroblock. Therefore, in such a case, the accuracy of image matching between the macroblocks is increased more and the encoding efficiency is accordingly improved more when the synthesized motion vector is used.

That is to say, a technology is required which detects a case where the encoding efficiency decreases when motion compensation is performed using a synthesized motion vector based on images captured at a high frame rate and, when detecting such a case, accordingly prevents the encoding efficiency from decreasing.

Here, a conventional technology for preventing an error in estimating a motion vector, that is, for avoiding estimation of an inefficient motion vector is described. Conventionally, a technology is known which replaces a target motion vector with a representative motion vector obtained using neighboring macroblocks when the target motion vector is significantly different from the representative motion vector (see Page 11 and FIG. 1 of Patent Reference 2, for example).

However, the problem described above is caused due to a reason which is essentially unrelated to the direction or size of the representative motion vector, and thus cannot be detected by the conventional technology which compares only the sizes of the vectors.

The present invention is conceived in view of the aforementioned problem and has an object to provide a new unit capable of detecting and preventing a case, according to a motion vector estimation method using images captured at a high frame rate, where encoding efficiency decreases due to an increase in motion-compensated prediction residual.

Solution to Problem

In order to solve the conventional problem, the imaging device in an aspect of the present invention is an imaging device including: an image receiving unit which receives images captured at a second frame rate higher than a first frame rate; a frame rate conversion unit which synthesizes the images that are captured at the second frame rate and received by the image receiving unit, so as to convert the images into a synthesized image having the first frame rate; a motion estimation unit which to performs a motion estimation between consecutive frames of the images which are captured at the second frame rate and received by the image receiving unit; a motion vector synthesis unit which synthesizes motion vectors obtained as a result of the motion estimation performed by the motion estimation unit between the frames of the images captured at the second frame rate, so as to generate a synthesized motion vector of a target macroblock in the synthesized image having the first frame rate; a motion blur amount determination unit which counts, in an area surrounding the target macroblock, the number of macroblocks having the same synthesized motion vector as the synthesized motion vector of the target macroblock, and compares a value derived from the number of counted macroblocks having the same synthesized motion vector with a threshold value, the counting and the comparison being performed for each target macroblock included in the synthesized image; a motion vector selection unit which selects the synthesized motion vector generated by the motion vector synthesis unit, when the motion blur amount determination unit determines as a result of the comparison that the value derived from the number of counted macroblocks exceeds the threshold value; and an encoding unit which encodes the synthesized image at the first frame rate using the synthesized motion vector selected by the motion vector selection unit.

With this configuration, only when the proportion of the image component of the moving object tracked by the motion vector between the images captured at the second frame rate is large in the target macroblock in the synthesized image, the target macroblock can be encoded using the synthesized motion vector. This can exclude a synthesized motion vector which causes the encoding efficiency to decrease as a result of an increase in the prediction residual due to a small proportion of the image component of the moving object included in the target-macroblock in the synthesized image. In addition, since the synthesized motion vector is generated from the images captured at the second frame rate, the amount of memory and the amount of calculation necessary for the motion vector estimation can be reduced. Accordingly, efficiency of the motion vector estimation can be increased.

Advantageous Effects of Invention

The imaging device according to the present invention can increase the efficiency of a motion vector estimation while excluding a synthesized motion vector which causes the encoding efficiency to decrease.

DESCRIPTION OF EMBODIMENTS

The following is a description of embodiments according to the present invention, with reference to the drawings.

Embodiment 1

Figure 1:
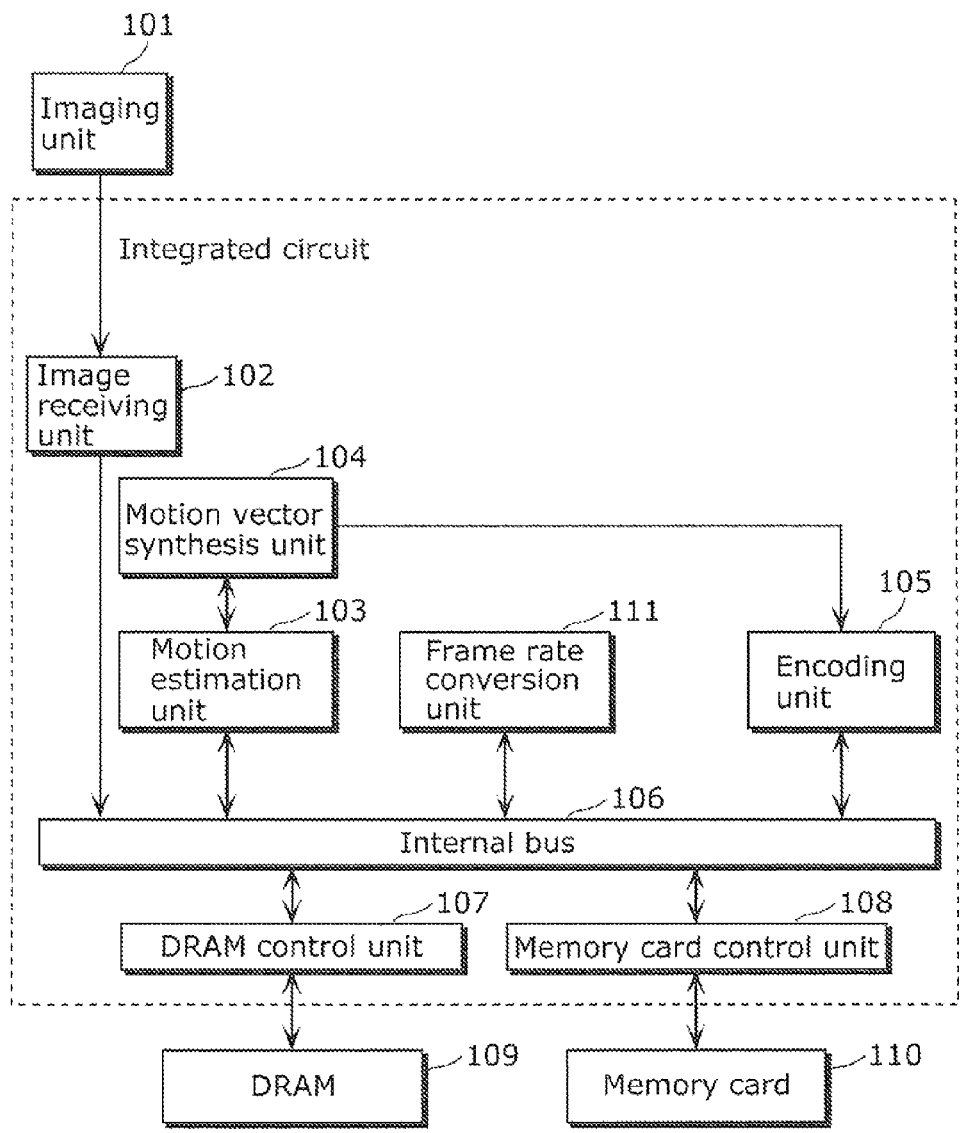
FIG. 1 is a diagram showing a configuration of a conventional imaging device.
Figure 2:
FIG. 2 is a diagram showing, in (A) to (G), image parts to explain a problem of the conventional imaging device.
Figure 5:
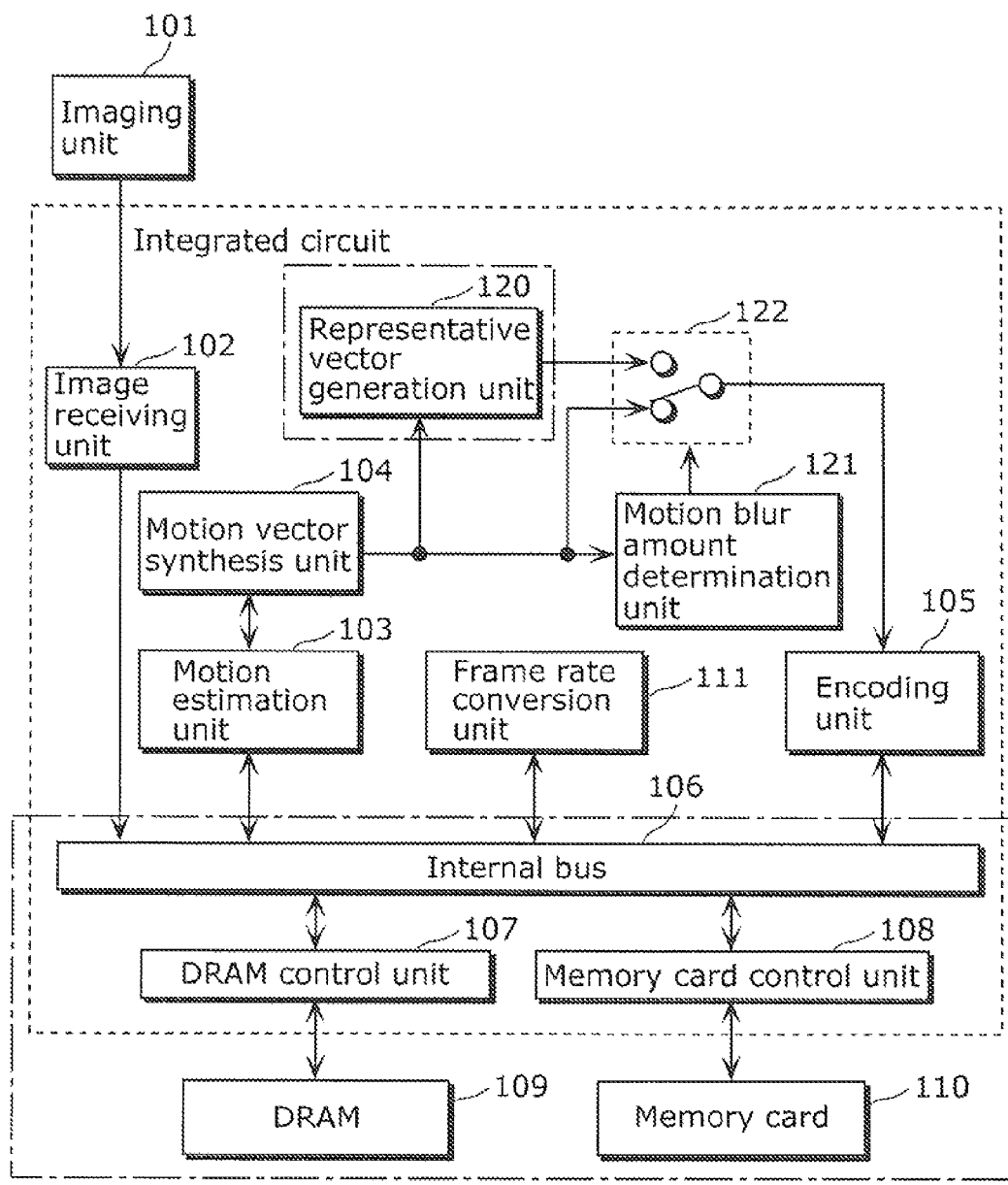
FIG. 5 is a diagram showing an example of a configuration of an imaging device in a first embodiment according to the present invention.

FIG. 5 is a diagram showing an example of a configuration of an imaging device in the first embodiment according to the present invention. In FIG. 5, components identical to those in FIG. 1 are assigned the same numerals used in FIG. 1. Thus, a description of these components is omitted. The imaging device in the first embodiment according to the present invention encodes and stores a synthesized frame image obtained by synthesizing a plurality of frame images captured at a high frame rate. The imaging device includes an imaging unit 101, an image receiving unit 102, a motion estimation unit 103, a motion vector synthesis unit 104, an encoding unit 105, an internal bus 106, a DRAM control unit 107, a memory card control unit 108, a DRAM 109, a memory card 110, a frame rate conversion unit 111, a representative vector generation unit 120, a motion blur amount determination unit 121, and a motion vector selection unit 122. The imaging device according to the present invention calculates a motion blur density of a moving object included in an image of a macroblock which is an encoding target in a synthesized frame image, and then determines whether encoding efficiency decreases when motion compensation is performed using a synthesized motion vector tracking the motion of the moving object. When it is determined that the encoding efficiency decreases, an encoding process is performed using a representative motion vector representing a motion of the whole background. Here, the motion blur density (also referred to as the "motion blur amount" hereafter) of the moving object refers to a proportion of an image component of the moving object to a background image component in an image in an encoding-target macroblock included in the synthesized frame image. To be more specific, the "motion blur density" refers to a ratio of a value obtained by counting the number of macroblocks having the same synthesized motion vector as the synthesized motion vector of the target macroblock and then multiplying the number of counted macroblocks by a macroblock size, with respect to a size of the synthesized motion vector. It should be noted that, in FIG. 5, the components enclosed by a dashed-dotted line are not essential to solve the conventional problem.

The imaging device shown in FIG. 5 in the first embodiment is different from the conventional imaging device shown in FIG. 1 in that the imaging device in the first embodiment includes the representative vector generation unit 120, the motion blur amount determination unit 121, and the motion vector selection unit 122.

Here, an explanation is given on the basis of the same example described in "Technical Problem" above. More specifically, the following describes the case where a synthesized motion vector is obtained for each 16×16 pixel macroblock which is commonly used in the MPEG encoding or the like and images captured at a high frame rate of 300 fps are encoded into a synthesized frame image having a target encoding frame rate of 60 fps.

The imaging unit 101 captures moving images at the high frame rate (300 fps) which is five times higher than the target encoding frame rate. The images captured by the imaging unit 101 are written into the DRAM 109 by the image receiving unit 102 via the internal bus 106 and the DRAM control unit 107. The DRAM 109 stores the images captured by the imaging unit 101 while the motion estimation unit 103 performs a motion vector estimation.

The frame rate conversion unit 111 converts the high-frame-rate images stored in the DRAM control unit 107 into images having a target encoding frame rate (60 fps). For doing so, the frame rate conversion unit 111 synthesizes five frame images to generate one synthesized frame image.

The motion estimation unit 103 sequentially performs a motion is vector estimation for each frame of the high-frame-rate images. The motion vector synthesis unit 104 synthesizes motion vectors obtained as a result of the estimations performed by the motion estimation unit 103. Accordingly, a synthesized motion vector corresponding to the target encoding frame rate is generated.

The representative vector generation unit 120 generates a representative vector from the synthesized motion vectors generated by the motion vector synthesis unit 104.

There are various methods of generating a representative motion vector. Example methods include, in order to obtain one representative vector: selecting an entire frame or a given area including a target macroblock and then averaging out vectors in the area; selecting a center value of the vectors in the area; selecting, by majority decision, a vector which is present most often in the area; and selecting one of the vectors that is the closest to the average vector in the area.

Any of the above methods is applicable. In the present embodiment, the representative vector generation unit 120 selects, by majority decision, a vector which is present most often in nine macroblocks configured by 3×3 macroblocks surrounding the target macroblock, as a representative motion vector of a target macroblock.

Using the synthesized motion vector generated by the motion vector synthesis unit 104, the motion blur amount determination unit 121 determines whether or not the motion blur amount in the target macroblock is sufficient.

Figure 3:
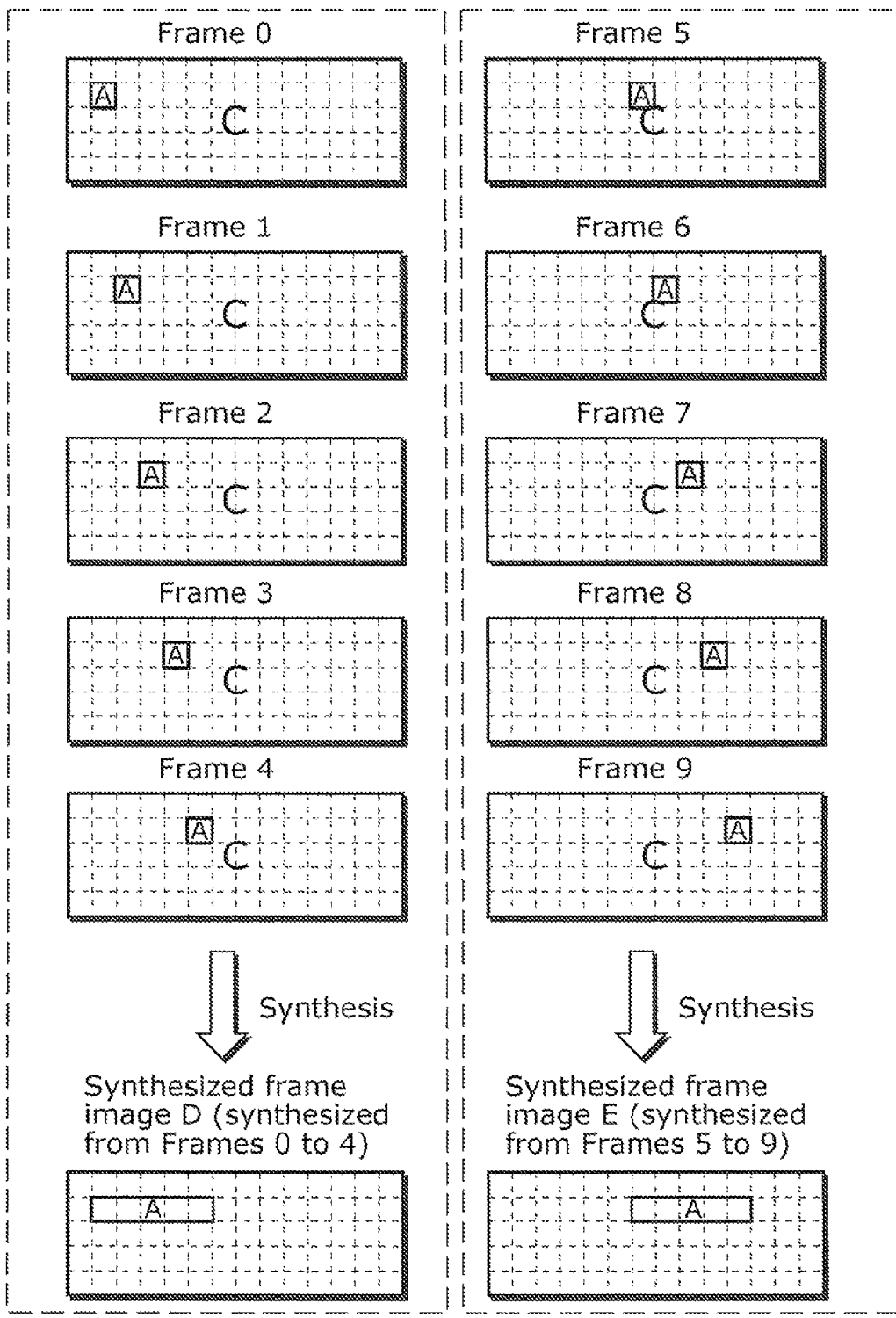
FIG. 3 is a diagram showing images captured by the conventional imaging device in a case where a problem is caused.
Figure 4:
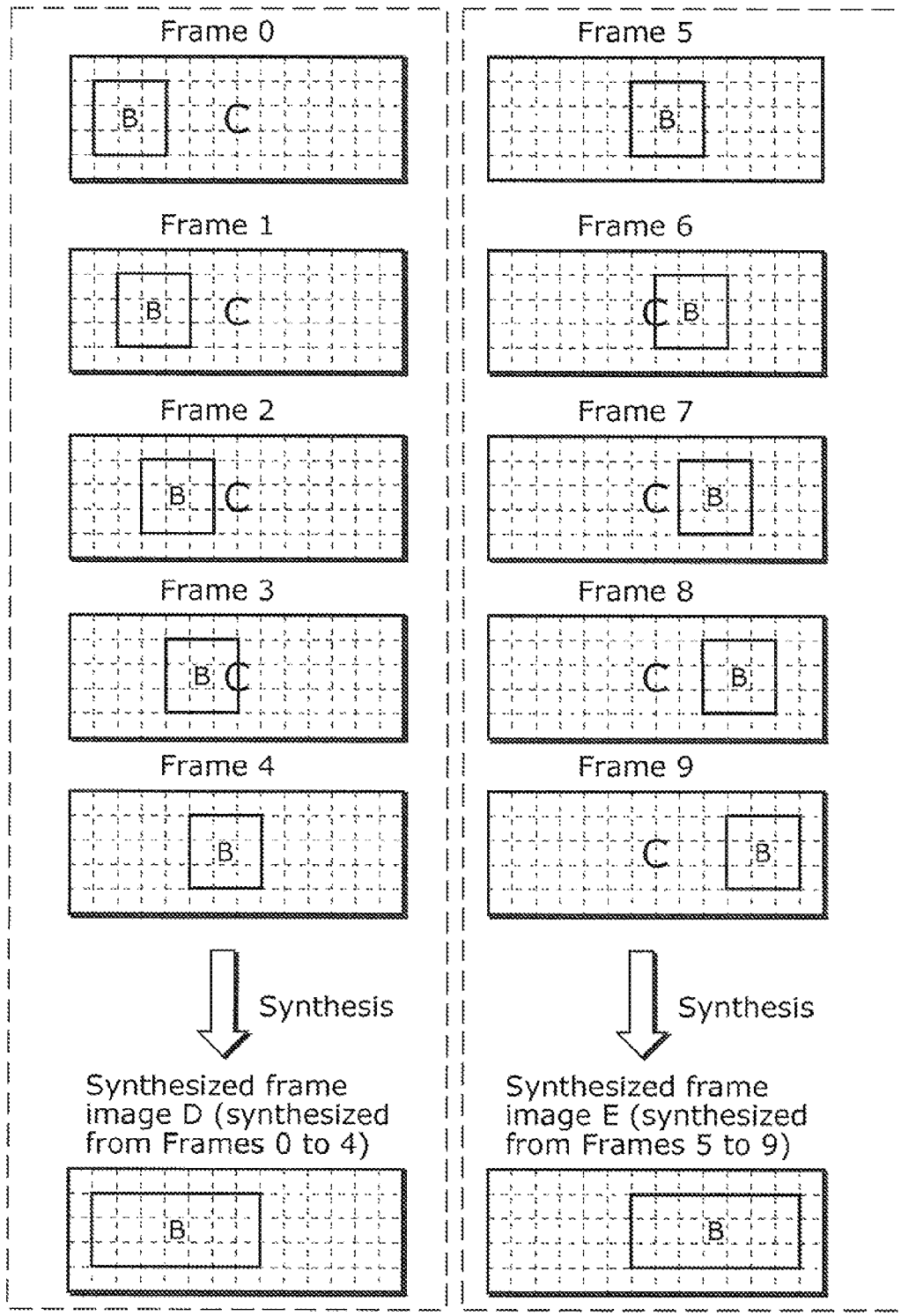
FIG. 4 is a diagram showing captured images when the conventional imaging device normally functions.

As describe above, when the encoding process is performed using the synthesized motion vector tracking the motion of the moving object as shown in FIG. 3, there are two cases where: the encoding efficiency is reduced; and the encoding efficiency is improved as shown in FIG. 4. The difference between these two cases is whether the motion blur amount of the moving object is sufficient in the target macroblock. As explained with reference to FIG. 3 and FIG. 4, the motion blur amount of the moving object in the target macroblock depends on the size of the moving object in the motion vector direction with respect to the size of the synthesized motion vector of the target macroblock. On this account, by counting the number of macroblocks which each have the same synthesized motion vector as the synthesized motion vector of the target macroblock in a forward or backward direction in the moving object image, a width of the moving object in the vector direction can be estimated.

When this width is ½ or more of a scalar quantity of the motion vector in motion compensation performed using the synthesized motion vector of the moving object, this means that an image component of the moving object makes up a ½ proportion or more in both the target macroblock and a macroblock corresponding to an estimated image. Thus, it is considered appropriate to use the synthesized motion vector of the moving object for motion compensation.

To be more specific, in the both of cases shown in FIG. 3 and FIG. 4, since the amount of motion is five macroblocks in size (that is, 16×5=80 pixels), a determining factor is whether a width of the object in the motion vector direction including both the forward and backward directions is 2.5 macroblocks (that is, 16×2.5=40 pixels) or more.

In the case shown in FIG. 3, the number of consecutive macroblocks having the same motion vector as the target macroblock in the forward direction (i.e., the rightward direction) of the motion vector of the object A is zero, and the number of consecutive macroblocks having the same motion vector as the target macroblock in the backward direction (i.e., the leftward direction) is zero. That is, the width is equivalent to a width of one macroblock in total. This means that the case shown in FIG. 3 does not satisfy the condition that the width of the object A in the motion vector direction including the forward and backward directions is 2.5 macroblocks or more.

In the case shown in FIG. 4, the number of consecutive macroblocks having the same motion vector as the target macroblock in the forward direction (i.e., the rightward direction) of the motion vector of the object B is one, and the number of consecutive macroblocks having the same motion vector as the target macroblock in the backward direction (i.e., the leftward direction) is one. That is, the width is equivalent to a width of three macroblocks in total. This means that the case shown in FIG. 4 satisfies the condition that the width of the object B in the motion vector direction including the forward and backward directions is 2.5 macroblocks or more.

Such a determination as described is made by the motion blur amount determination unit 121. Note that the following describes an example where the high-frame-rate images are used only for obtaining a synthesized motion vector and where the motion blur density is approximately calculated using the synthesized frame image including the target macroblock.

Figure 6:
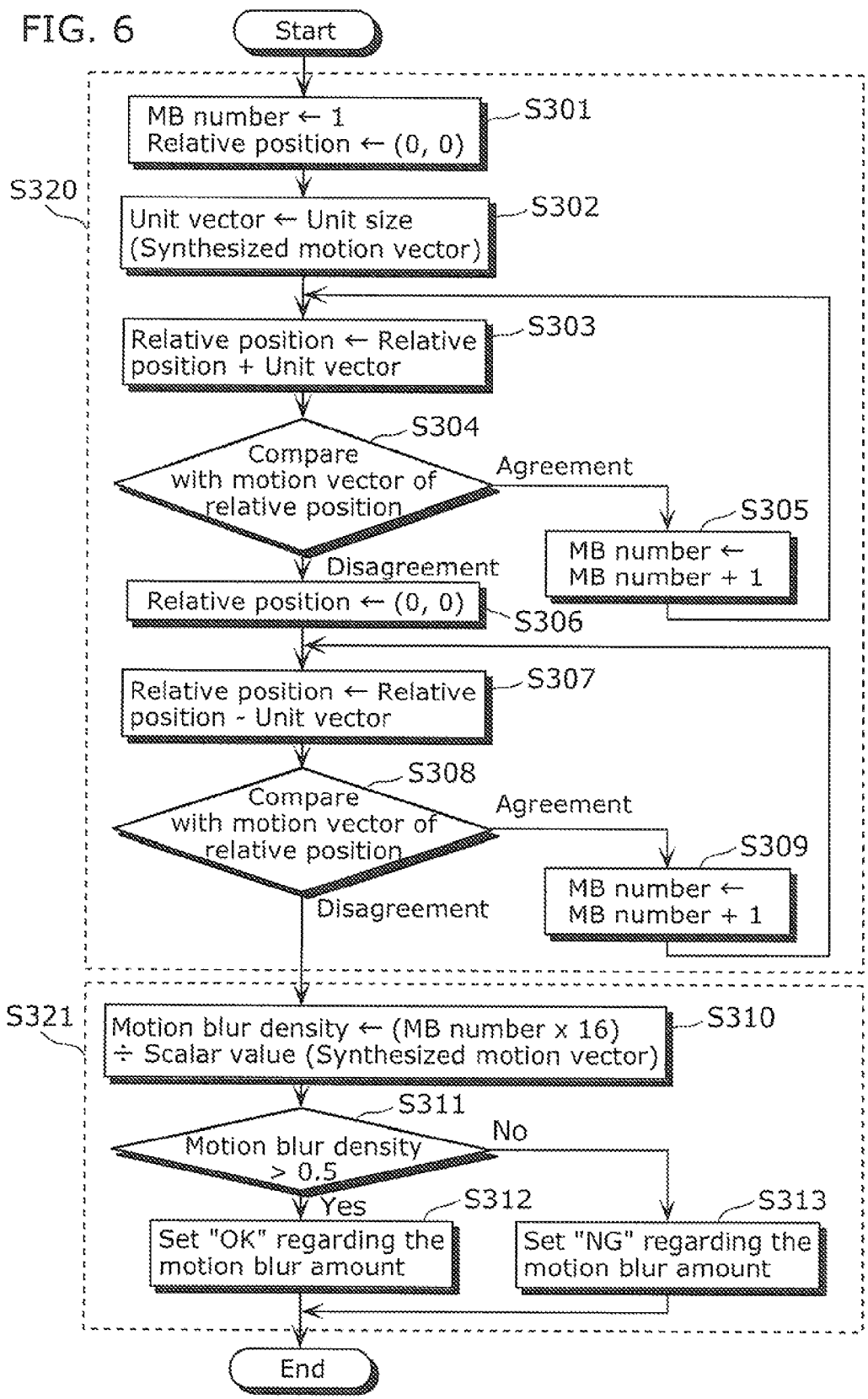
FIG. 6 is a flowchart showing a motion blur amount determination method in the first embodiment according to the present invention.

FIG. 6 is a flowchart showing a detailed operation performed by the motion blur amount determination unit 121 shown in FIG. 5.

As shown in FIG. 6, the operation performed by the motion blur amount determination unit 121 is roughly divided into: step S320 of obtaining the number of macroblocks having the same synthesized motion vector; and step S321 of determining the motion blur amount.

Firstly, step S320 performed by the motion blur amount determination unit 121 to obtain the number of macroblocks having the same synthesized motion vector is explained in detail.

The number of macroblocks having the same synthesized motion vector is referred to as an MB number. In step S301, "1" is set as the MB number for the target macroblock, and coordinate values of a relative position indicating the target macroblock at which a comparison is to be started is initialized to (0, 0) (S301).

Next, in step S302, the size of the synthesized motion vector is set to a unit size of 16 pixels, namely, the macroblock size. To be more specific, the direction of the synthesized motion vector is not changed and only the scalar quantity is converted into 16 to be a unit vector (S302).

Following this, in step S303, the unit vector is added to the relative position to calculate the relative coordinates of the macroblock which is to be a comparison target for the synthesized motion vector. Then, the relative position is moved by one macroblock in the direction of the synthesized motion vector (S303).

Next, in step S304, it is determined whether or not the synthesized motion vector of the macroblock located at the position relative to the target macroblock agrees with the synthesized motion vector of the target macroblock (S304).

When the synthesized motion vectors are determined to agree with each other in step S304, the MB number is increased by 1 in step S305 and the processing returns to step S303 (S305).

When the synthesized motion vectors are determined to disagree with each other in step S304, the relative position is returned to (0, 0) of the target macroblock in step S306 (S306).

Following this, in step S307, the unit vector is subtracted from the relative position to calculate the relative coordinates of the macroblock which is to be a comparison target of the synthesized motion vector. Then, this time, the relative position is moved by one macroblock, from the position of the target macroblock, in the backward direction of the synthesized motion vector (S307).

Next, in step S308, it is determined whether or not the synthesized motion vector of the macroblock located at the position relative to the target macroblock agrees with the synthesized motion vector of the target macroblock (S308).

When the synthesized motion vectors are determined to agree with each other in step S308, the MB number is increased by 1 in step S309 and the processing returns to step S307 (S309).

When the synthesized motion vectors are determined to disagree with each other in step S308, the process of counting the MB number is completed (S308).

According to step S320 of obtaining the number of macroblocks as described thus far, the number of macroblocks is calculated which are present in the forward and backward directions of the synthesized motion vector of the target macroblock and which have the same synthesized motion vector as the synthesized motion vector of the target macroblock.

Next, step 321 performed to determine the motion blur amount in the target macroblock is explained in detail.

In step S310, the motion blur density in the synthesized frame image is calculated by multiplying the MB number obtained in step S320 by 16 which is the macroblock size and then dividing this result by the scalar value of the synthesized motion vector (S310).

Following this, in step S311, it is determined whether or not the motion blur density is 0.5 or more (S311).

When the motion blur density exceeds 0.5, "OK" is set in step S312 regarding the motion blur amount into a register which holds the result of the motion blur amount determination (S312).

When the motion blur density is 0.5 or lower, "NG" is set in step S313 regarding the motion blur amount into the register which holds the result of the motion blur amount determination (S313).

Accordingly, step S321 of determining the motion blur amount is completed.

Figure 7:
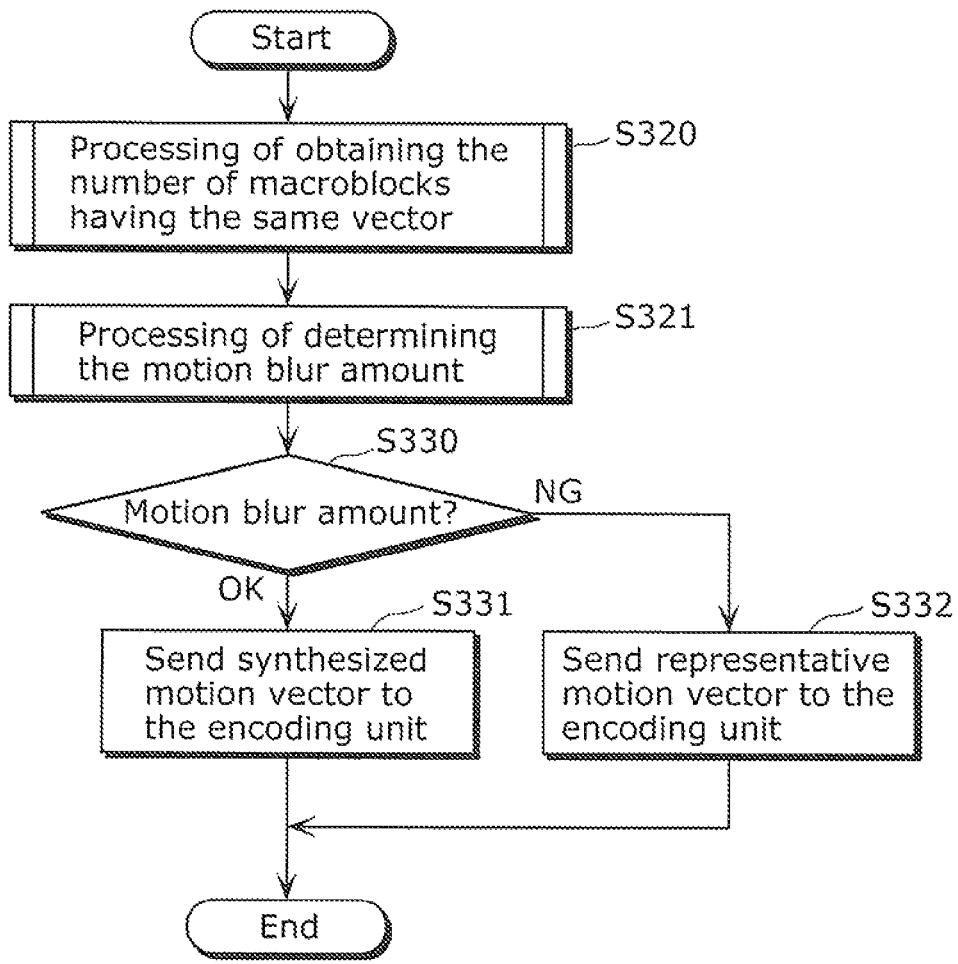
FIG. 7 is a flowchart showing an entire encoding process in the first embodiment according to the present invention.

FIG. 7 is a flowchart showing the encoding process performed by the whole of the imaging device in the first embodiment. Through the procedural steps described above, the result of the motion blur amount determination performed by the motion blur amount determination unit 121 is sent to the motion vector selection unit 122. The motion vector selection unit 122 is a switching unit, such as a selector or a switch. On the basis of the determination result given by the motion blur amount determination unit 121, the motion vector selection unit 122 selects either an output of the motion vector synthesis unit 104 or an output of the representative vector generation unit 120 (S330).

When "OK" is set regarding the motion blur amount, the motion vector selection unit 122 selects the output of the motion vector synthesis unit 104 and sends the synthesized motion vector of the target macroblock to the encoding unit 105 (S331). On the other hand, when "NG" is set regarding the motion blur mount, the motion vector selection unit 122 selects the output of the representative vector generation unit 120 and sends the representative motion vector generated by the representative vector generation unit 120 to the encoding unit 105 (S332).

The encoding unit 105 performs motion compensation, using the motion vector selected by the motion vector selection unit 122, on the synthesized frame image generated by the frame rate conversion unit 111, and encodes a difference obtained as a result of the motion compensation. Then, the encoding unit 105 records the encoded image data into the memory card 110 via the memory card control unit 108.

With the configuration described thus far, the motion vector of the moving object image having a faint motion blur density in the synthesized frame image and thus blending into the background image can be canceled to be replaced by the representative motion vector.

It is often the case that the representative motion vector is the motion vector of the background image. On this account, the encoding efficiency can be improved in most cases where the encoding efficiency is reduced through motion compensation performed using the synthesized motion vector of the moving object image.

It should be noted that each of the functional blocks including the image receiving unit 102, the motion estimation unit 103, the motion vector synthesis unit 104, the encoding unit 105, the internal bus 106, the DRAM control unit 107, the memory card control unit 108, the frame rate conversion unit 111, the representative vector generation unit 120, the motion blur amount determination unit 121, and the motion vector selection unit 122 enclosed by a dotted line in FIG. 5 is implemented as a Large Scale Integration (LSI) which is typically an integrated circuit.

These components may be integrated into individual chips or into one chip including some or all of the components.

Although referred to as the LSI here, it may be referred to as an Integrated Circuit (IC), a system LSI, a super LSI, or an ultra LSI depending on the scale of integration.

A method for circuit integration is not limited to application of an LSI. It may be realized using a dedicated circuit or a general purpose processor. After an LSI is manufactured, a Field Programmable Gate Array (FPGA) which is programmable or a reconfigurable processor for which the connections and settings of circuit cells inside the LSI are reconfigurable may be used.

Moreover, when a circuit integration technology that replaces LSIs comes along owing to advances of the semiconductor technology or to a separate derivative technology, the function blocks should be understandably integrated using that technology. There can be a possibility of adaptation of biotechnology, for example.

Furthermore, each of the representative vector generation unit 120, the motion blur amount determination unit 121, and the motion vector selection unit 122 can be configured with a logic circuit. Alternatively, some or all of the representative vector generation unit 120, the motion blur amount determination unit 121, and the motion vector selection unit 122 can be configured with a general purpose processor unit and a software program.

It should be noted that although the imaging unit 101 is used for capturing images, the present invention is not limited to this. For example, the synthesized motion vector may be calculated and the encoding process may be accordingly performed using, as the input images, images transmitted via communication or broadcasting or images stored in a storage device such as a memory card.

In the present embodiment, the memory card 110 is used as an output destination of the encoding result. However, the result can be not only recorded into a storage device such as a memory card or a hard disk, but also can be directly sent outside the imaging device via communication or broadcasting.

Embodiment 2

Figure 8:
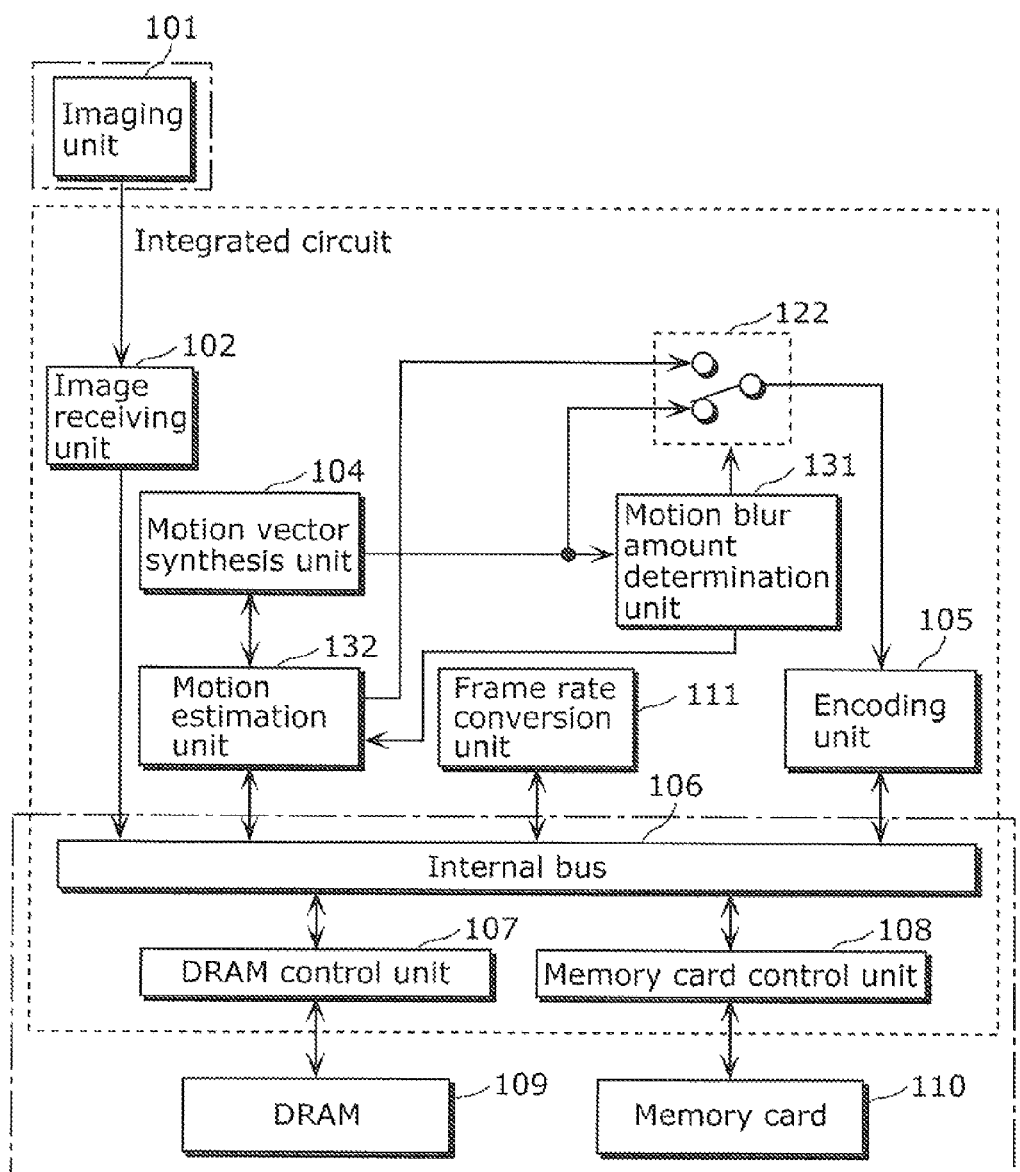
FIG. 8 is a diagram showing an example of a configuration of an imaging device in a second embodiment according to the present invention.

FIG. 8 is a diagram showing an example of a configuration of an imaging device in the second embodiment according to the present invention. In FIG. 8, components identical to those in FIG. 1 and FIG. 5 are assigned the same numerals used in FIG. 1 and FIG. 5. Thus, a description of these components is omitted. The imaging device in the second embodiment includes an imaging unit 101, an image receiving unit 102, a motion vector synthesis unit 104, an encoding unit 105, an internal bus 106, a DRAM control unit 107, a memory card control unit 108, a DRAM 109, a memory card 110, a frame rate conversion unit 111, a motion vector selection unit 122, a motion blur amount determination unit 131, and a motion estimation unit 132. It should be noted that, also in FIG. 8, the components enclosed by a dashed-dotted line are not essential to solve the conventional problem. When "NG" is set regarding the motion blur amount, the imaging device of the second embodiment performs a motion vector estimation anew based on block matching, instead of using the synthesized motion vector, between the synthesized frame images obtained after the frame rate conversion. Then, using the motion vector obtained as a result of the re-estimation, the imaging device executes motion compensated encoding.

Here, an explanation is given on the basis of the same example described in "Technical Problem" above. More specifically, the following describes the case where the size of one macroblock is 16×16 pixels which is commonly used in the MPEG encoding or the like and images are captured by the imaging unit 101 at a high frame rate of 300 fps which is five times higher than an target encoding frame rate of 60 fps.

The imaging unit 101 captures moving images at the high frame rate (300 fps) which is five times higher than the target encoding frame rate (60 fps). The images captured by the imaging unit 101 in are written into the DRAM 109 by the image receiving unit 102 via the internal bus 106 and the DRAM control unit 107.

The frame rate conversion unit 111 converts the high-frame-rate images stored in the DRAM control unit 107 into moving images having the target encoding frame rate (60 fps). For doing so, the frame rate conversion unit 111 synthesizes five high-frame-rate images into a single frame.

The motion estimation unit 132 performs a motion vector estimation on the images between consecutive frames captured at the high frame rate. To be more specific, the motion estimation unit 132 sequentially performs the motion vector estimation between the consecutive frames captured at the 5×-speed frame rate. The motion vector synthesis unit 104 sequentially synthesizes motion vectors of the five frames obtained as a result of the estimations performed by the motion estimation unit 132, and accordingly generates a synthesized motion vector corresponding to the target encoding frame rate.

Using the synthesized motion vector generated by the motion vector synthesis unit 104, the motion blur amount determination unit 131 determines whether or not the motion blur amount in the target macroblock is sufficient. The determination method is the same as the method shown by the flowchart of FIG. 6 in the first embodiment and, therefore, the explanation is omitted here.

Figure 9:
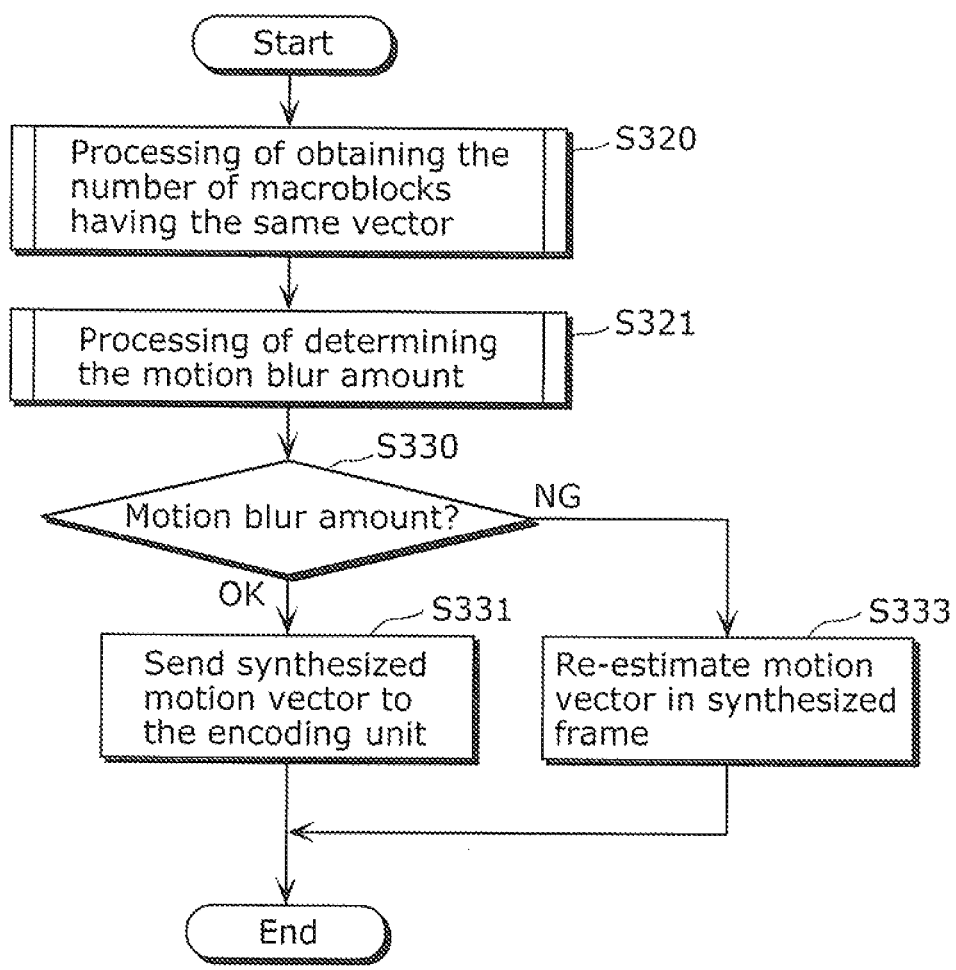
FIG. 9 is a flowchart showing an entire encoding process in the second embodiment according to the present invention.

FIG. 9 is a flowchart showing the encoding process performed by the whole of the imaging device in the second embodiment. After the completion of step S321 of determining the motion blur amount shown in FIG. 6, the motion blur amount determination unit 131 sends, to the motion estimation unit 132, an instruction to execute a re-estimation when "NG is set regarding the motion blur amount.

Receiving the re-estimation instruction from the motion blur amount determination unit 131, the motion estimation unit 132 performs a motion vector re-estimation, based on block matching, on the synthesized frame image at the target encoding frame rate (60 fps) having been converted by the frame rate conversion unit 111, to obtain a re-estimated vector (S333).

When "OK" is set regarding the motion blur amount, the motion vector selection unit 122 sends the synthesized motion vector to the encoding unit 105 (S331). On the other hand, when "NG" is set regarding the motion blur mount, the motion vector selection unit 122 sends the re-estimated vector obtained by the motion estimation unit 132 to the encoding unit 105.

The encoding unit 105 performs motion compensation, using the motion vector selected by the motion vector selection unit 122, on the image generated by the frame rate conversion unit 111, and encodes a difference. Then, the encoding unit 105 records the encoded difference pixel data into the memory card 110 via the memory card control unit 108.

With the configuration described thus far, the synthesized motion vector of the moving object image having a faint motion blur density and thus blending into the background image can be canceled to be replaced by the motion vector re-estimated between the synthesized frames corresponding to the images which are originally to be the encoding targets.

The re-estimation process may increase the amount of calculation according to the frequency of occurrence. However, since this re-estimation is performed on the encoding target, the estimation accuracy is increased and thus the encoding efficiency is improved.

It should be noted that each of the functional blocks including the image receiving unit 102, the motion vector synthesis unit 104, the encoding unit 105, the internal bus 106, the DRAM control unit 107, the memory card control unit 108, the frame rate conversion unit 111, the motion vector selection unit 122, the motion blur amount determination unit 131, and the motion estimation unit 132 is implemented as an LSI which is typically an integrated circuit.

These components may be integrated into individual chips or into one chip including some or all of the components.

Although referred to as the LSI here, it may be referred to as an Integrated Circuit (IC), a system LSI, a super LSI, or an ultra LSI depending on the scale of integration.

A method for circuit integration is not limited to application of an LSI. It may be realized using a dedicated circuit or a general purpose processor. After an LSI is manufactured, a Field Programmable Gate Array (FPGA) which is programmable or a reconfigurable processor for which the connections and settings of circuit cells inside the LSI are reconfigurable may be used.

Moreover, when a circuit integration technology that replaces LSIs comes along owing to advances of the semiconductor technology or to a separate derivative technology, the function blocks should be understandably integrated using that technology. There can be a possibility of adaptation of biotechnology, for example.

Furthermore, each of the representative vector generation unit 120, the motion blur amount determination unit 121, and the motion vector selection unit 122 can be configured with a logic circuit. Alternatively, some or all of these units can be configured with a general purpose processor unit and a software program.

It should be noted that although the imaging unit 101 is used for capturing moving images at the high frame rate, the present invention is not limited to this. For example, the processing may be performed on, as the high-frame-rate moving images, images transmitted via a communication network or a broadcast wave or images stored in a storage device such as a memory card.

In the present embodiment, the memory card 110 is used as an output destination of the encoding result. However, the result can be not only recorded into a storage device such as a memory card or a hard disk, but also can be directly sent outside the imaging device via communication or broadcasting.

(Another Example of Synthesized Frame Image Generation)

The above first and second embodiments describe the case where the frame rate conversion unit 111 performs the frame rate conversion by simply adding the high-frame-rate images to achieve a synthesis. However, the present invention is not limited to this. For example, the image of the target frame rate may be obtained through a synthesis achieved by a weighted addition instead of a simple addition.

(Another Example of the Encoding Process when the Motion Blur Amount is NG)

The above first and second embodiments describe the case where the motion compensation is performed using the representative motion vector when the motion blur amount in the target macroblock is NG. However, the present invention is not limited to this. For example, when the motion blur amount in the target macroblock is determined to be NG, the motion compensation may be performed assuming that the motion vector is 0. To be more specific, intra-coding may be performed based on the amount of motion (0, 0). In this case, a difference between a target macroblock and a macroblock located at the same position as the target macroblock in a reference frame is encoded. Here, the reference frame refers to, for example, a synthesized frame immediately previous to a synthesized frame including the target macroblock. Moreover, when the motion blur amount in the target macroblock is determined to be NG, intra-coding may be performed instead of motion compensation.

(Another Example of Detecting the Size of the Moving Object)

The above first and second embodiments describe the case where the number of macroblocks having the same motion vector is counted to detect the width of the moving object in the direction of the motion vector (S320 in FIG. 6). However, the present invention is not limited to this. From the target macroblock as a counting start position (S301), the number of macroblocks having the same color may be counted in the direction of the motion vector while variations in a predetermined range are allowed.

(Another Example of the Motion Blur Density)

The above first and second embodiments describe the case where "OK" is set regarding the motion blur amount when the motion blur density exceeds 0.5 (S312 in FIG. 6). However, the present invention is not limited to this. As the motion blur density, 0.5 is an example of most preferable threshold values. Thus, another value may be set as appropriate. For example, the threshold value of the motion blur density may be finely adjusted, to 0.6 or 0.4 according to a situation, to reduce quantization errors caused due to the processing performed for each macroblock.

(Another Example of Numerical Limitation)

The above first and second embodiments describe the case where the target encoding frame rate is 60 fps and the high frame rate is 300 fps which is five times higher than the target encoding frame rate. However, the present invention is not limited to this. The target encoding frame rate is not limited to 60 fps, and may be set at a preferable frame rate as appropriate according to a method defined by a standard or the like. Also, the high frame rate at which the input images are captured is not limited to the 5x-speed, namely, 300 fps, and may be set at a preferable frame rate as appropriate according to the capability of the imaging unit. Moreover, the size of the macroblock on which the synthesized motion vector estimation, the motion compensation, and the encoding process are performed does not necessarily have to be 16×16 pixels. According to a standard or the like, the size of a block may be 8×8 pixels.

It should be obvious that any combination of the stated embodiments is included in the scope of the present invention.

INDUSTRIAL APPLICABILITY

The imaging device according to the present invention is useful to, for example, a digital camera which efficiently performs a motion estimation using high frame rate photography with a less amount of calculation, which prevents a vector estimation error, and which efficiently encodes and stores the captured moving images. Also, the present invention is applicable to an imaging device, such as a live camera, which sends the captured moving images to a communication path while encoding these images.

REFERENCE SIGNS LIST

101 Imaging unit
102 Image receiving unit
103, 132 Motion estimation unit
104 Motion vector synthesis unit
105 Encoding unit
106 Internal bus
107 DRAM control unit
108 Memory card control unit
109 DRAM
110 Memory card
111 Frame rate conversion unit
120 Representative vector generation unit
121, 131 Motion blur amount determination unit
122 Motion vector selection unit

The invention claimed is:

1. An imaging device comprising:
an image receiving unit configured to receive images captured at a second frame rate higher than a first frame rate;
a frame rate conversion unit configured to synthesize the images which are captured at the second frame rate and received by said image receiving unit, so as to convert the images into a synthesized image having the first frame rate;
a motion estimation unit configured to perform a motion estimation between consecutive frames of the images which are captured at the second frame rate and received by said image receiving unit;
a motion vector synthesis unit configured to synthesize motion vectors obtained as a result of the motion estimation performed by said motion estimation unit between the frames of the images captured at the second frame rate, so as to generate a synthesized motion vector of a target macroblock in the synthesized image having the first frame rate;
a motion blur amount determination unit configured to count, in an area surrounding the target macroblock, the number of macroblocks having a same synthesized motion vector as the synthesized motion vector of the target macroblock, and to compare a value derived from the number of counted macroblocks having the same synthesized motion vector with a threshold value, the counting and the comparison being performed for each target macroblock included in the synthesized image;
a motion vector selection unit configured to select the synthesized motion vector generated by said motion vector synthesis unit, when said motion blur amount determination unit determines as a result of the comparison that the value derived from the number of counted macroblocks exceeds the threshold value; and
an encoding unit configured to encode the synthesized image at the first frame rate using the synthesized motion vector selected by said motion vector selection unit.

2. The imaging device according to claim 1,
wherein said motion blur amount determination unit is configured to calculate, as the value derived from the number of counted macroblocks, a ratio of a value obtained by multiplying the number of counted macroblocks by a macroblock size with respect to a size of the synthesized motion vector, and to compare the calculated ratio with the threshold value.

3. The imaging device according to claim 2, further comprising
a representative vector generation unit configured to generate a representative motion vector representing a motion of a predetermined area larger than the target macroblock, using the synthesized motion vector generated by said motion vector synthesis unit,
wherein said motion vector selection unit is configured to select the representative motion vector generated by said representative vector generation unit, when said motion blur amount determination unit determines as a result of the comparison that the ratio is equal to or lower than the threshold value, and
said encoding unit is configured to encode the synthesized image at the first frame rate using the representative motion vector selected by said motion vector selection unit.

4. The imaging device according to claim 2,
wherein, when said motion blur amount determination unit determines as a result of the comparison that the ratio is equal to or lower than the threshold value, said motion estimation unit is configured to perform a motion estimation, based on block matching, on the synthesized image obtained through the frame rate conversion performed by said frame rate conversion unit, so as to estimate a re-estimated motion vector,
said motion vector selection unit is configured to select the re-estimated motion vector estimated by said motion estimation unit, when said motion blur amount determination unit determines as a result of the comparison that the ratio is equal to or lower than the threshold value, and
said encoding unit is configured to encode the synthesized image at the first frame rate using the re-estimated motion vector selected by said motion vector selection unit.

5. The imaging device according to claim 2,
wherein the threshold value is ½.

6. The imaging device according to claim 1,
wherein said motion blur amount determination unit is configured to detect and count the macroblocks each having the same synthesized motion vector as the synthesized motion vector of the target macroblock in one of forward and backward directions from the target macroblock.

7. The imaging device according to claim 1, further comprising:
an imaging unit configured to capture the images at the second frame rate, and to send the captured images to said image receiving unit; and
a recording unit configured to record, onto a recording medium removable from said imaging device, encoded image data obtained as a result of the encoding performed at the first frame rate by said encoding unit.

8. A semiconductor integrated circuit comprising:
an image receiving unit configured to receive images captured at a second frame rate higher than a first frame rate;
a frame rate conversion unit configured to synthesize the images which are captured at the second frame rate and received by said image receiving unit, so as to convert the images into a synthesized image having the first frame rate;
a motion estimation unit configured to perform a motion estimation between consecutive frames of the images which are captured at the second frame rate and received by said image receiving unit;
a motion vector synthesis unit configured to synthesize motion vectors obtained as a result of the motion estimation performed by said motion estimation unit between the frames of the images captured at the second frame rate, so as to generate a synthesized motion vector of a target macroblock in the synthesized image having the first frame rate;
a motion blur amount determination unit configured to count, in an area surrounding the target macroblock, the number of macroblocks having a same synthesized motion vector as the synthesized motion vector of the target macroblock, and to compare a value derived from the number of counted macroblocks having the same synthesized motion vector with a threshold value, the counting and the comparison being performed for each target macroblock included in the synthesized image;
a motion vector selection unit configured to select the synthesized motion vector generated by said motion vector synthesis unit, when said motion blur amount determination unit determines as a result of the comparison that the value derived from the number of counted macroblocks exceeds the threshold value; and
an encoding unit configured to encode the synthesized image at the first frame rate using the synthesized motion vector selected by said motion vector selection unit.

9. A motion vector determination method comprising:
receiving images captured at a second frame rate higher than a first frame rate; generating a synthesized motion vector by synthesizing motion vectors obtained as a result of a motion estimation performed between consecutive frames of the received images having the second frame rate; and determining whether or not to use the generated synthesized motion vector as a motion vector of a target macroblock included in a synthesized image obtained by a conversion from the second frame rate to the first frame rate,
wherein a motion blur amount determination unit is configured to count, in an area surrounding the target macroblock, the number of macroblocks having a same synthesized motion vector as the synthesized motion vector of the target macroblock, the counting being performed for each target macroblock included in the synthesized image,
the motion blur amount determination unit is configured to calculate a ratio of a value obtained by multiplying the number of counted macroblocks by a macroblock size with respect to a size of the synthesized motion vector, and to compare the calculated ratio with a threshold value, and
a motion vector selection unit is configured to select the synthesized motion vector as the motion vector of the target macroblock included in the synthesized image having the first frame rate, when the ratio is determined, as a result of the comparison, to exceed the threshold value.

* * * * *